United States Patent
Ishikawa et al.

(10) Patent No.: US 10,288,882 B2
(45) Date of Patent: May 14, 2019

(54) HEAD MOUNTED DISPLAY DEVICE

(71) Applicant: NIPPON SEIKI CO., LTD., Niigata (JP)

(72) Inventors: Teruko Ishikawa, Niigata (JP); Ikuyo Sasajima, Niigata (JP); Yuki Takahashi, Niigata (JP); Tadashige Makino, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 15/557,351

(22) PCT Filed: Mar. 7, 2016

(86) PCT No.: PCT/JP2016/057008
§ 371 (c)(1),
(2) Date: Sep. 11, 2017

(87) PCT Pub. No.: WO2016/143744
PCT Pub. Date: Sep. 15, 2016

(65) Prior Publication Data
US 2018/0239136 A1 Aug. 23, 2018

(30) Foreign Application Priority Data

Mar. 12, 2015 (JP) .................................. 2015-049921
Mar. 20, 2015 (JP) .................................. 2015-057277

(51) Int. Cl.
*H04N 13/383* (2018.01)
*H04N 13/344* (2018.01)
(Continued)

(52) U.S. Cl.
CPC ....... *G02B 27/017* (2013.01); *G02B 27/0179* (2013.01); *G06F 3/013* (2013.01);
(Continued)

(58) Field of Classification Search
None
See application file for complete search history.

(56) References Cited

U.S. PATENT DOCUMENTS

2012/0050484 A1* 3/2012 Boross ................ H04N 13/122
348/46
2013/0208014 A1* 8/2013 Fleck ................ G06K 9/00684
345/672
(Continued)

FOREIGN PATENT DOCUMENTS

JP H10-262165 A 9/1998
JP 2014-066927 A 4/2014
(Continued)

OTHER PUBLICATIONS

Search Report issued in corresponding International Patent Application No. PCT/JP2016/057008, dated May 24, 2016.

*Primary Examiner* — Kyle Zhai
(74) *Attorney, Agent, or Firm* — McDermott Will & Emery LLP

(57) ABSTRACT

Provided is a head mounted display (HMD) device that lets a user organize added information and thereby makes it possible to improve the ease with which the information can be perceived. A head mounted display device enables a user to visually recognize a virtual image overlaid on a scene. A control unit virtually sets a plurality of display zones, having different depth-direction positions, in front of the user; identifies a display zone being gazed at by the user, on the basis of gaze position information from a gaze position detection unit; drives a focus position adjusting unit so as to align the depth position of the identified display zone with the focus position of a virtual image of the displayed image; acquires, from a cloud server via a communication unit, image information indicating information associated with the identified display zone; and causes a display to display (Continued)

the display image corresponding to the acquired image information.

5 Claims, 9 Drawing Sheets

(51) Int. Cl.
    *H04N 13/128*     (2018.01)
    *G02B 27/01*     (2006.01)
    *G06T 19/00*     (2011.01)
    *G09G 5/38*     (2006.01)
    *G06F 3/01*     (2006.01)
    *H04N 5/64*     (2006.01)

(52) U.S. Cl.
    CPC ............ *G06T 19/006* (2013.01); *G09G 5/38* (2013.01); *H04N 13/128* (2018.05); *H04N 13/344* (2018.05); *H04N 13/383* (2018.05); *G02B 2027/014* (2013.01); *G02B 2027/0138* (2013.01); *G02B 2027/0187* (2013.01); *G09G 2320/0261* (2013.01); *G09G 2380/10* (2013.01); *H04N 5/64* (2013.01)

(56) References Cited

U.S. PATENT DOCUMENTS

| | | | |
|---|---|---|---|
| 2014/0043335 A1* | 2/2014 | Kobayashi | G06T 19/20 345/427 |
| 2014/0085203 A1 | 3/2014 | Kobayashi | |
| 2016/0078685 A1 | 3/2016 | Koga et al. | |

FOREIGN PATENT DOCUMENTS

| | | |
|---|---|---|
| JP | 2014-119786 A | 6/2014 |
| JP | 2014-225727 A | 12/2014 |
| JP | 2015-032131 A | 2/2015 |

* cited by examiner

FIG.4

| DISPLAY ZONE | ASSOCIATED INFORMATION | PRIORITY | INFORMATION EXAMPLE |
|---|---|---|---|
| Z3 | INFORMATION ON A WARNING STATE | HIGH | WARNING STATE |
| Z1 | INFORMATION ON A USER AND MOBILE BODY | MEDIUM | STATE OF USER (HEART RATE, PULSE, BRAIN WAVE, ETC.), STATE OF MOBILE BODY (VEHICLE SPEED, ENGINE SPEED, ETC.) |
| Z2 | AR INFORMATION OVERLAID ON A SCENE | LOW | STORE INFORMATION, ROUTE GUIDANCE INFORMATION, NEAR-MISS INFORMATION |

HEAD MOUNTED DISPLAY DEVICE

CROSS REFERENCE

This application is the U.S. National Phase under 35 U.S.C. § 371 of International Application No. PCT/JP2016/057008, filed on Mar. 7, 2016, which claims the benefit of Japanese Application No. 2015-057277, filed on Mar. 20, 2015 and Japanese Application No. 2015-049921, filed on Mar. 12, 2015, the entire contents of each are hereby incorporated by reference.

TECHNICAL FIELD

The present invention relates to a transmission type head mounted display (HMD) device that allows a viewer to visually recognize a virtual image overlaid on a scene.

BACKGROUND ART

A transmission type HMD device that allows a viewer to view a virtual image overlaid on a scene is conventionally known (see, for example, Patent Literature 1). The HMD device is a display to be mounted on a head, and configured to project display light from a display to a user using projection optics or a light guide to allow the user to visually recognize a virtual image of a display image indicated by the display light. The user can visually recognize a virtual image by the HMD device overlaid on a real scene in front. Further, the HMD device can apply a technique called Augmented Reality (AR). That is, by displaying an AR image related to a real scene as a display image, information can be added to the real scene.

In addition, as an HMD device, technologies capable of changing an imaging position of a virtual image visually recognized by a user are disclosed in Patent Literatures 2 and 3. In the technique disclosed in Patent Literature 2, an imaging position of a virtual image is changed by mechanically switching an interval between a display panel and a magnifying optical member of a virtual image distance control unit. In the technique disclosed in Patent Document 3, an imaging position of a virtual image is changed by image processing by moving an emitting area of an image formed by display light from a pair of display drive units.

CITATION LIST

Patent Literature

Patent Literature 1: JP-A-2014-119786
Patent Literature 2: JP-A-H10-262165
Patent Literature 3: JP-A-2015-032131

SUMMARY OF THE INVENTION

Problems to be Solved by the Invention

As described above, the transmission type HMD device can provide information by overlaying a virtual image on a real scene. But, as a virtual image always appears in the field of vision of the user, visible information increases and becomes troublesome for the user. This raises a problem that the user is difficult to organize the information and the recognition of each information is reduced.

The present invention has been made in view of the above problem, and it is an object of the present invention to provide an HMD device that is able to allow a user to organize information to be added and improve the recognition of information.

A head mounted display device according to the present invention has the following features in order to solve the above problems.

The head mounted display device that allows a user to visually recognize a virtual image overlaid on a scene, comprising:

a gaze position detection unit for detecting a gaze position of a user;

a display for emitting display light indicating a display image;

a communication unit capable of communicating with an external server;

a control unit configured to cause a display to display a display image corresponding to image information acquired from the external server via the communication unit; and an imaging position adjustment unit capable of adjusting an imaging position of a virtual image of the display image visually recognized by a user by the display light, wherein the control unit controls the following:

virtually sets a plurality of display zones with different depth direction positions in front of the user;

identifies a display zone being gazed by the user based on the gaze position information from the gaze position detection unit;

drives the imaging position adjustment unit to align the depth position of the identified display zone with the imaging position of the virtual image of the display image and;

acquires image information indicating the information associated with the identified display zone from the external server via the communication unit, and causes the display to display the display image corresponding to the acquired image information.

Effect of the Invention

According to the present invention, a user can organize information to be added and improve recognition of information.

BRIEF DESCRIPTION OF THE DRAWINGS

FIG. 4 is a table showing a display zone virtually set in the head mounted display device and an example of information associated with a display zone.

MODE FOR CARRYING OUT THE INVENTION

Hereinafter, embodiments of the present invention will be described with reference to the drawings. It should be noted that the present invention is not limited by the following embodiments (including the contents of the drawings). Of course, it is possible to add changes (including deletion of constituent elements) to the following embodiments. In the following description, descriptions of known technical matters are appropriately omitted to facilitate understanding of the present invention.

Figure 1:
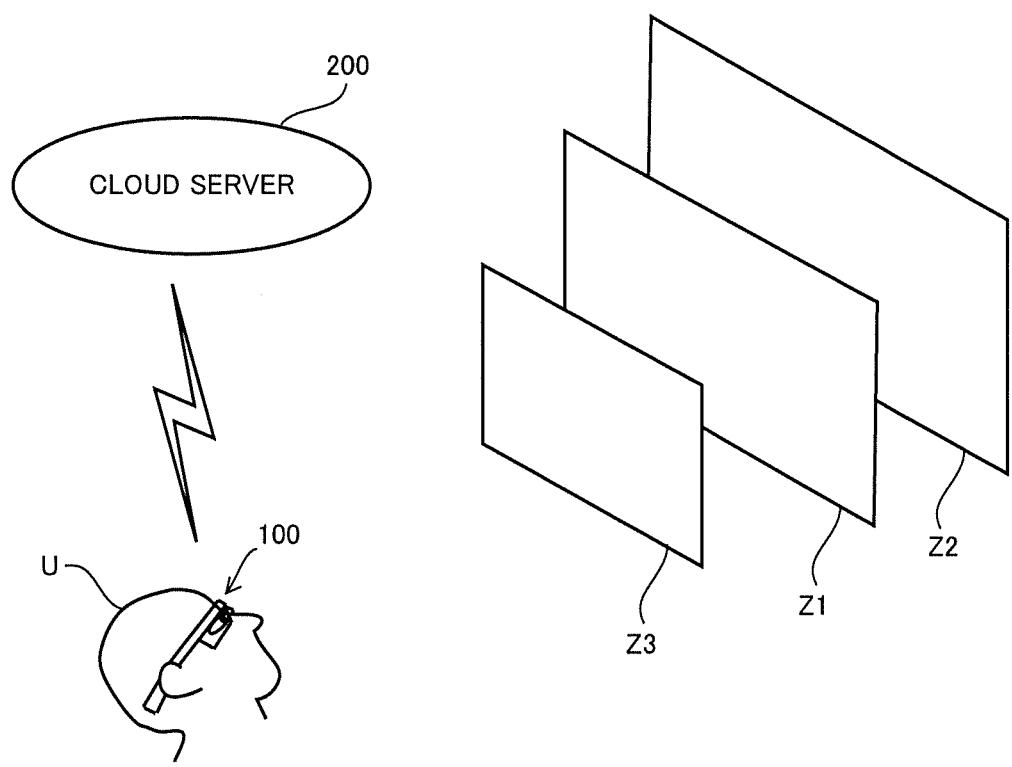
FIG. 1 is a view showing an overview of a head mounted display device according to a first embodiment of the present invention.
Figure 2:
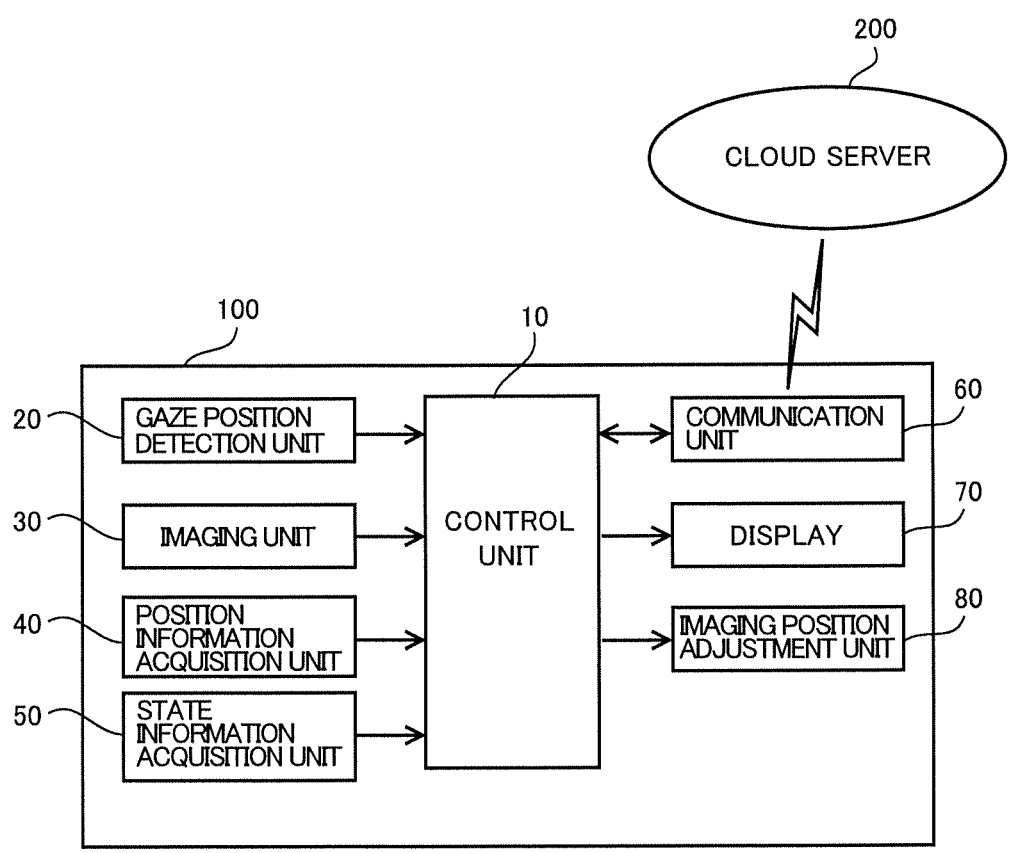
FIG. 2 is a block diagram showing an electrical configuration of the head mounted display device.

FIG. 1 is a diagram showing an overview of a head mounted display device (hereinafter also referred to as an HMD device) 100 according to a first embodiment of the present invention. FIG. 2 is a diagram showing an electrical configuration of the HMD device 100.

The HMD device 100 comprises a control unit 10, a gaze position detection unit 20, an imaging unit 30, a position information acquisition unit 40, a state information acquisition unit 50, a communication unit 60, a display 70, and an imaging position adjustment unit 80.

The HMD device 100 is a glass-type display mounted on the head of the user U. The HMD device 100 is connected to the cloud server (external server) 200 by wireless communication, and constitutes a display system including the HMD device 100 and the cloud server 200. In the cloud server 200, biometric information such as personal information and body information of the user U, map information, and image information indicating various kinds of information respectively associated with the first, second, and third display zones Z 1, Z 2, Z 3 to be described later are accumulated by network communication. The HMD device 100 receives arbitrary image information from the cloud server 200 by display processing to be described later, displays a display image showing various kinds of information, enters display light indicating a display image into the eyes of the user U through a lens or an optical member (not shown), and allows the user U to visually recognize a virtual image of a display image overlaid on a scene in front.

The control unit 10 includes a CPU (Central Processing Unit) comprising a microcomputer for example and actually conducting a process (such as control of the entire HMD device 100) executed by the control unit 10, a RAM (Random Access Memory) functioning as a main memory of the CPU, a ROM (Read Only Memory) for storing various programs to cause the control unit 10 to execute processes to be described later, and various converters for digitally converting information (signal) input to and output from the control unit 10 for the CPU or analog converting it for output. In addition to the CPU, the control unit 10 may include various dedicated circuits (for example, an image processing circuit, etc.) for executing a part of the processing performed by the control unit 10 on behalf of the CPU.

As shown in FIG. 1, the control unit 10 virtually sets first, second, and third display zones Z 1, Z 2, and Z 3 with a different depth direction in front of the user U. The first display zone Z 1 is a display zone located between the second display zone Z 2 and the third display zone Z 3. The second display zone Z 2 is a display zone located deeper than the first display zone Z 1 (the deepest side). The third display zone Z 3 is a display zone located closer to the user U than the first display zone Z 1 (closest to the front).

Figure 3:
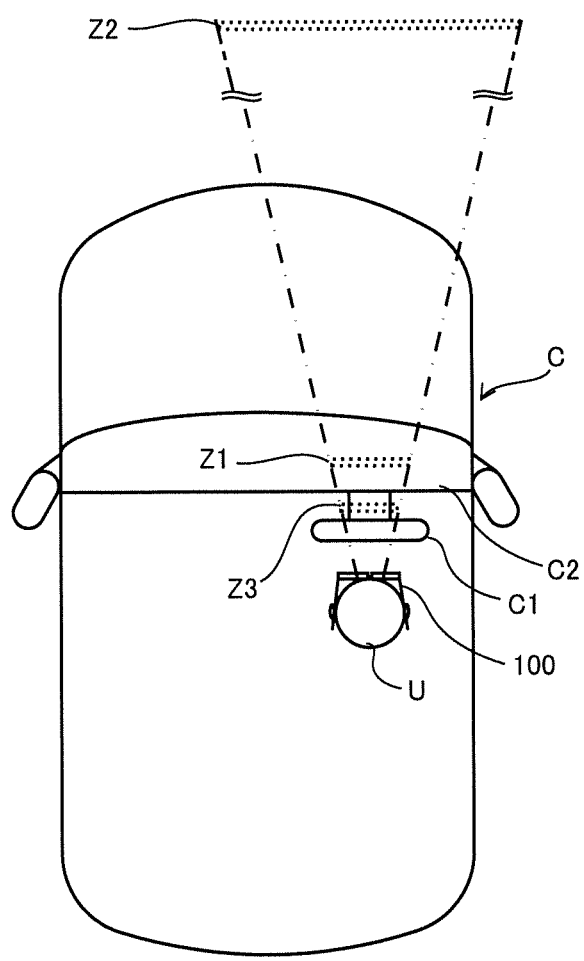
FIG. 3 is a view showing a state in which a user wearing the head mounted display device is on board a vehicle.

The depth position of each display zone Z 1, Z 2, Z 3 is arbitrarily set, but as shown in FIG. 3, it can be set as follows, assuming the user U sitting in a driver's seat of the vehicle C and looking ahead of the vehicle C, for example. That is, the depth position of the third display zone Z 3 is near the steering wheel C 1 that is located between the user U (driver) and the instrument panel C 2. The depth position of the first display zone Z 1 is near the instrument panel C 2 that is deeper than the steering wheel C 1. The depth position of the second display zone Z 2 is near a scene deeper than the instrument panel C 2 and 15 m ahead from the user U visible from the windshield. In the above description, the examples of the depth positions of the first, second and third display zones Z 1, Z 2, Z 3 are described. The first, second and third display zones Z 1, Z 2, Z 3 are not set only in the portion overlapping with the respective parts of the vehicle, but are set ahead of the face of the user U.

As described above, the cloud server 200 stores image information indicating information associated with the first, second, and third display zones Z 1, Z 2, and Z 3. FIG. 4 shows an example of information associated with the display zones Z 1, Z 2, Z 3. The first display zone Z 1, the second display zone Z 2, and the third display zone Z 3 are respectively associated with information in the priority order of the third display zone Z 3, the first display zone Z 1 and the second display zone Z 2. That is, on the basis of the first display zone Z 1, information with a lower priority is associated with the second display zone Z 2, and information with a higher priority is associated with the third display zone Z 3. The first display zone Z 1 is associated with information with a second highest priority (priority "medium"), for example, information (first information) relating to the user U and the mobile body moving with the user, such as, states of the user U (heart rate, pulse, brain wave, etc.) and states of the vehicle C on which the user U boards (an example of a mobile body moving with the user U) (running speed, engine speed, remaining fuel, etc.). The second display zone Z 2 is associated with the AR information (second information) with the lowest priority (priority "low"), for example, information to be overlaid on a scene, such as, surrounding shop information, route guidance information, and near-miss information. The third display zone Z 3 is associated with information (third information) with the highest priority (priority "high"), for example, information relating to a warning state with a high degree of urgency, such as, a poor physical condition of the user U and a failure of the vehicle C.

The gaze position detection unit 20 detects a gaze position of the user U by detection of a line of sight and measurement of an eye axis. In the case of detection of a line of sight, the eyes of the user U are imaged with a CCD camera or the like, and the direction of the line of sight of the user U is detected as a gaze position by a pattern matching process of image processing technology. In the case of eye axis measurement, by irradiating ultrasonic waves to the eyeball of the user U and calculating the distance to the anterior and posterior surfaces of the lens of the eye and the anterior surface of the retina from the echo propagation time, measure the eye axial length (the length from the anterior surface of the cornea of the eye to the anterior surface of the retina, including the axial lengths of the cornea, anterior chamber, crystalline lens and vitreous tissue) and the crystalline lens thickness, and detect a focal position of the user U as a gaze position based on the measurement results. The gaze position detection unit 20 transmits gaze position information of the user U to the control unit 10.

The imaging unit 30 consists of for example, a CCD camera or the like and images a scene in front of the user U. The imaging unit 30 transmits image information on the scene image ahead of the user U to the control unit 10.

The position information acquisition unit 40 includes, for example, a GPS antenna and gets a current position of the user U. The position information acquisition unit 40 transmits position information indicating a current position of the user up to the control unit 10.

The state information acquisition unit 50 is connected to various sensors for detecting states of the user U and a mobile body (vehicle C) moving with the user U, and acquires user state information indicating states of the user U and mobile body state information indicating states of a mobile body, and transmits the information to the control unit 10. Examples of states of the user U include a heart rate, a pulse, an electroencephalogram and the like. When a mobile body is the vehicle C, the states of the mobile body include a running speed, an engine speed, residual fuel, a running distance and the like.

The communication unit 60 comprises a transmission unit and a reception for performing radio communication with the cloud server 200, transmits various information, including gaze position information from the control unit 10, specific display zone information to be described later, imaging information, position information, state information, to the cloud server 200, receives image information from the cloud server 200, and transmits the image information to the control unit 10.

The display 70 comprises, for example, a TFT type liquid crystal display or an organic EL display, displays a predetermined display image, and emits display light representing a display image.

The imaging position adjustment unit 80 is capable of changing an imaging position of a virtual image of a display image to be visually recognized by the user U. Specifically, as an example, in order to change the optical path length of the display light from the display 70 to the user U, the unit consists of a motor or the like that can move the display 70 to change the distance between the display 70 and the lens (not shown). Further, when an optical member is provided between the display 70 and the lens, the unit may be a device to change the position of the optical member. Further, the unit may be a device to process an image as adjustment of the imaging position. Further, the unit may be a device to adjust the position of the image to be incident on the left and right eyes for changing the imaging position by the left and right parallax, or a device to display an image blurred so that the image can be visually recognized clearly at an arbitrary focal length. In this case, the control unit 10 may also serve as the imaging position adjustment unit 80. Therefore, adjustment and changing of the imaging position may be caused by the illusion of the user U.

Figure 5:
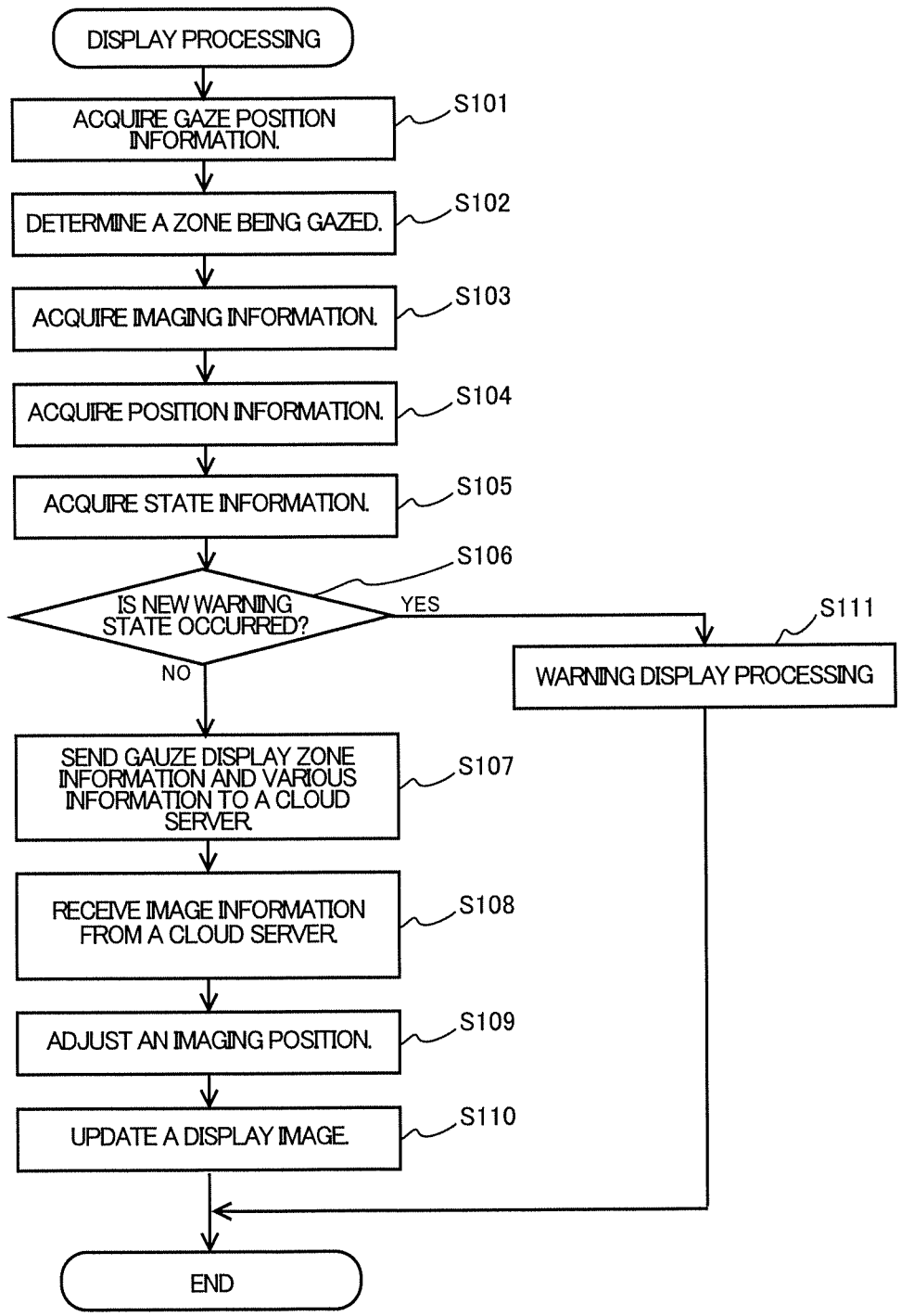
FIG. 5 is a flowchart showing display processing in the head mounted display device.

Next, with reference to FIG. 5, the normal display processing based on a gaze position of the HMD device 100 will be described.

First, in step S 101, the control unit 10 acquires gaze position information indicating a gaze position of the user U from the gaze position detection unit 20. In addition to the receiving, the information by be calculated from the received information.

Next, in step S 102, based on the gaze position information, the control unit 10 specifies a display zone being gazed by the user U (hereinafter also referred to as a gaze display zone) from the first, second, and third display zones Z 1, Z 2, and Z 3. Specifically, the control unit 10 specifies a display zone whose depth position is closest to the gaze position as a gaze display zone. Incidentally, there may be a case of determining that there is no gaze display zone, based on the gaze position information.

In step S 103, the control unit 10 acquires image information obtained by imaging a scene in front of the user U from the imaging unit 30.

In step S 104, the control unit 10 acquires position information indicating a current position of the user U from the position information acquisition unit 40.

In step S 105, the control unit 10 acquires user state information and mobile body state information (hereinafter also referred to as state information collectively) indicating states of the user U and states of the mobile body moving with the user U from the state information acquisition unit 50).

Next, in step S 106, the control unit 10 determines whether a new warning state has occurred, based on the gaze position information, imaging information, and state information acquired in steps S 101, S 103 to S 105. It should be noted that the warning state in this embodiment means a state in which an event indicated by information with a high degree of urgency to be displayed in the third display zone Z 3 has occurred. In addition to the above information, the control unit 10 may also receive information indicating the occurrence of a warning state from the outside, and determine whether a new warning state has occurred. When a new warning state is determined not have been occurred in step S 106 (step S 106; No), the control unit 10 executes the processing after step S 107. When a new warning state is determined to have been occurred (step S 106; Yes), the control unit executes the warning display processing of step S 111. The warning display processing will be described later in detail.

In step S 107, the control unit 10 transmits the gaze position display zone information indicating the gaze display zone determined in step S 102, the gaze position information acquired in steps S 101, S 103 to S 105, the imaging information, and the state information to the cloud server 200 via the communication unit 60.

The cloud server 200 having received this information from the HMD device 100 (of the communication unit 60) extracts the image information indicating the information associated with the display zone identified from the image information accumulated in itself; based on the received gaze display zone information and various kinds of information. Specifically, when the gaze display zone is the first display zone Z 1, the cloud server 200 sets the type of information to be extracted as "information on the user U and the mobile body" associated with the first display zone Z 1, and extracts the image information to be displayed based on the state information (for example, numerals, characters, symbols, etc. indicating the value or the degree of the state information). When the gaze display zone is the second display zone Z 2, the cloud server 200 sets the type of information to be extracted as "AR information to be overlaid on a scene" associated with the second display zone Z 2, and extracts the image information to be displayed based on the gaze position information, the imaging information and the position information (for example, shop information around the gaze position of the user U, a route guidance mark overlaid on a road, near-miss information around a current position). When the gaze display zone is the third display zone Z 3, the cloud server 200 sets the type of information to be extracted as "information on the warning state with a high degree of urgency" associated with the third display zone Z 3, and extracts the image information to be displayed based on the state information and the like (for example, a letter or symbol for notifying a poor physical condition of the user U, trouble, disorder of the mobile body, etc.). The cloud server 200 transmits the extracted image information to the HMD device 100.

Next, in step S 108, the control unit 10 receives the image information extracted by the cloud server 200 via the communication unit 60. The HMD device 100 may receive in advance a part of the image information indicating the information associated with each of the display zones Z 1 to Z 3 from the cloud server 200, and store it in an internal storage unit (not shown), and read out the image information to be displayed out of the information associated with the gaze display zone from the storage unit, based on the gaze position display zone information indicating the gaze display zone determined in step S 102, the gaze position information obtained in steps S 101, S 103 to S 105, imaging information, and state information.

Next, in step S 109, the control unit 10 drives the imaging position adjustment unit 80 to align the depth position of the gaze display zone identified in step S 102 with the imaging position of the virtual image of the display image.

Next, in step S 110, the control unit 10 causes the display 70 to display a display image corresponding to the image information received from the cloud server 200 in step S 107 (to update the display image).

By repeating the above processing, the HMD device 100 allows the user U to visually recognize the information related to the gaze position as a virtual image corresponding to the gaze position of the user U. As a result, the information relating to the position being gazed by the user U is automatically switched and displayed, and the user U can easily organize the information added by the virtual image and the recognition of information can be improved.

Figure 6:
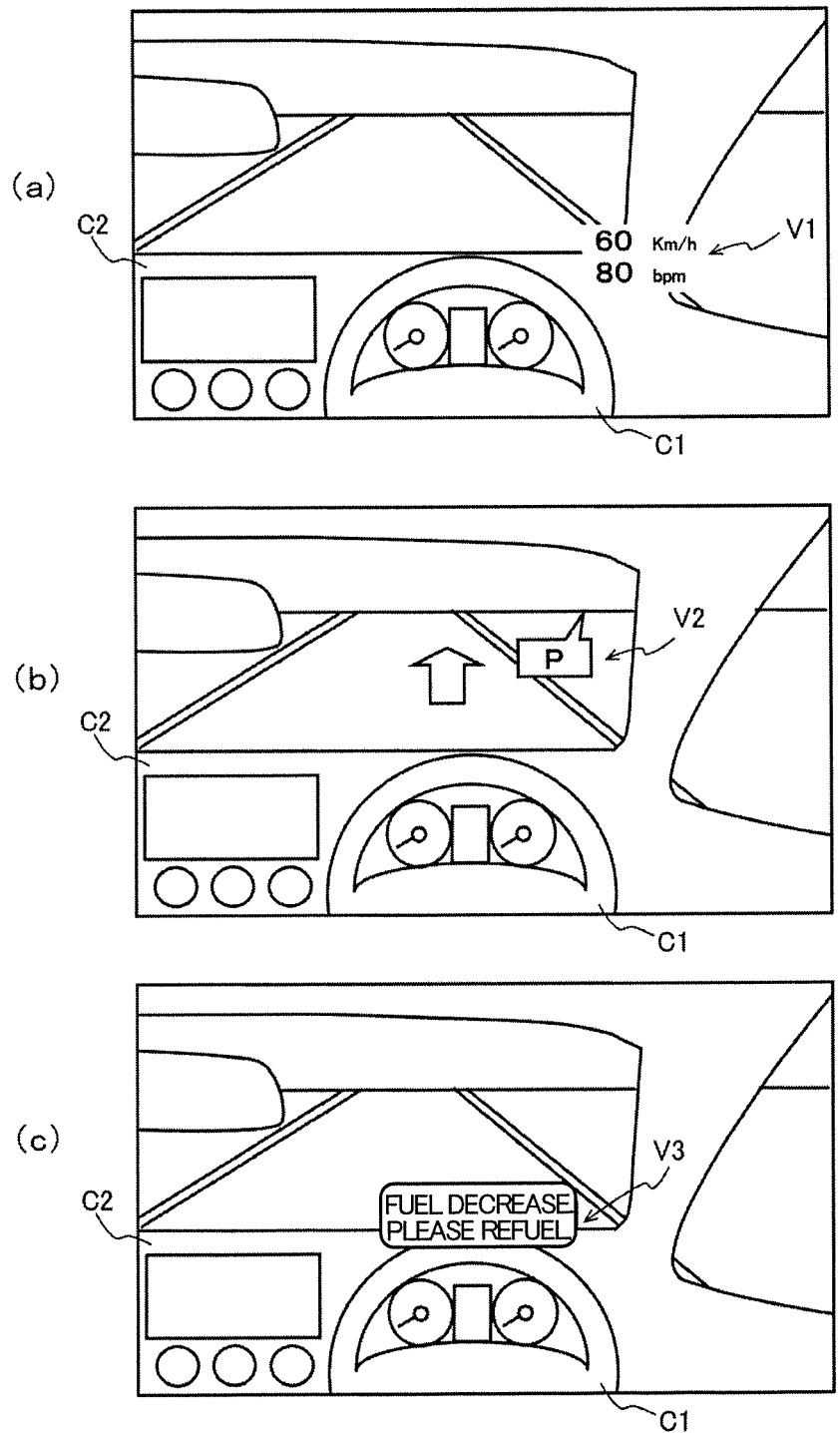
FIG. 6 is a diagram showing a display example of the head mounted display device.

FIG. 6 shows a display example of the HMD device 100 when the user U is driving the vehicle C. FIG. 6, shows a virtual image of a display image visually recognized by the user U. FIG. 6 (*a*) shows an example when a gaze display zone is the first display zone Z 1. In the example shown in FIG. 6 (*a*), as information on the user U and the mobile body, display information indicating a running speed (60 Km/h) of the vehicle C and a pulse (80 bpm) of the user U is displayed on the display 70, and the virtual image V 1 of the display image is visually recognized by the user U. FIG. 6 (*b*) shows an example when a gaze display zone is the second display zone Z 2. In the example shown in FIG. 6 (*b*), as AR information overlaid on a scene, a display image indicating a route guidance mark (arrow mark) and a parking lot mark (icon including "P") is displayed on the display 70, and the virtual image V 2 of the display image is visually recognized by the user U. FIG. 6 (*c*) shows an example when a gaze display zone is the third display zone Z 3. In the example shown in FIG. 6 (*c*), as a message relating to a warning state with a high degree of urgency, a display image indicating a text message (letters "Fuel decrease. Please refuel.") notifying decrease in fuel (warning state) is displayed on the display 70, and the virtual image V 3 of the display image is visually recognized by the user U.

Figure 7:
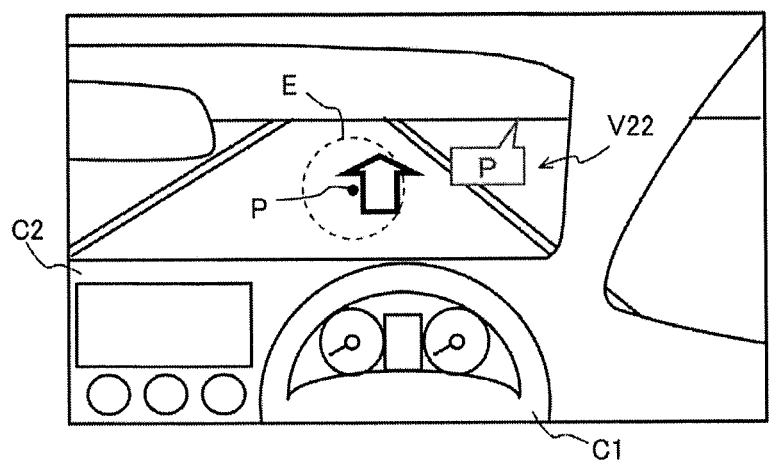
FIG. 7 is a view showing another display example of the head mounted display device.

FIG. 7 shows another display example of the HMD device 100 when the user U is driving the vehicle C. In another display example, based on the gaze position information acquired in step S 101, a display image is displayed on the display 70 so that among the information included in the display image, the information whose virtual image is located in the vicinity of the gaze position P is emphasized with respect to the information whose virtual image is located outside the vicinity of the gaze position P of the user U. In the present embodiment, the control unit 10 determines that the information is located at a position near the gaze position P of the user U when at least a part of its virtual image is determined to be located inside a gaze region E including the gaze position P of the user U, according to the gaze position information and the position of the information of the display image displayed on the display 70. When its virtual image is determined to be located outside the gaze region E, the control unit 10 determined that the information is located outside the vicinity of the gaze position P of the user U. It should be noted that the gaze region E is a circular region extending in the horizontal direction of the vehicle C (the direction perpendicular to the front-back direction of the user U) with the gaze position P as a center. FIG. 7 shows a virtual image of a display image visually recognized by the user U. FIG. 7 shows an example when a gaze display zone is the second display zone Z 2. In the example shown in FIG. 7, a display image including a route guidance mark (an arrow mark) and a parking lot mark (an icon including "P") is displayed on the display 70 as AR information to be overlaid on a scene, and the virtual image V 22 of the display image is visually recognized by the user U. Further, among the AR information included in the display image, a part of a virtual image of the route guidance mark is located inside the gaze region E, a virtual image of the parking lot mark is located outside the gaze region E, and a display image in which the route guidance mark is more emphasized than the parking lot mark is displayed on the display 70. Here, emphasizing specific information more than other information means making specific information more clearly visible to the user U than other information. As a specific method for this purpose, there are methods of increasing display brightness of specific information higher than other information and using a different display color. In addition, there is a method of relatively emphasizing specific information by reducing the visibility of other information, for example, by reducing the display brightness of other information, changing a display color of other information from color to monochrome (black and white), and displaying other information blurred (shifting the focus), etc. In such other display examples, when the gaze display zone is the first and third display zones Z 1 and Z 3, similarly, based on the gaze position information acquired in step S 101, a display image is displayed on the display 70 so that among the information included in the display image, the information whose virtual image is at least partially located inside the gauze region E including the gaze position P of the user U, that is, located near the gaze position P, is emphasized with respect to the information whose virtual image is located outside the gaze position P of the user U. The virtual image is visually recognized by the user U.

Figure 8:
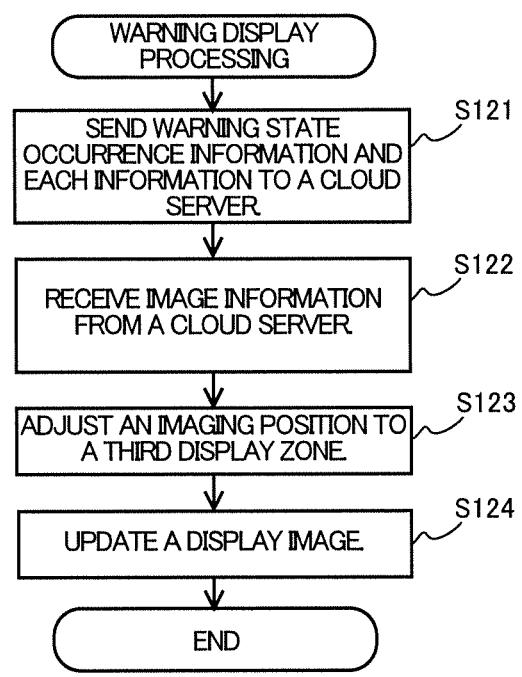
FIG. 8 is a flowchart showing warning display processing in the head mounted display device.

Next, the warning display processing in step S 111 will be described with reference to FIG. 8.

First, in step S 121, the control unit 10 transmits the warning state occurrence information indicating occurrence of a warning state, the gaze position information acquired in steps S 101, S 103 to S 105, the imaging information, and the state information to the cloud server 200 via the communication unit 60.

Upon receiving this information from (the communication unit 60 of) the HMD device 100, the cloud server 200 extracts the image information indicating the information associated with the third display zone Z 3 from the image information accumulated in itself; based on the received warning state occurrence information and various kinds of information. Specifically, the cloud server 200 sets the type of the information to be extracted as "information on a warning state with a high degree of urgency" associated with the third display zone Z 3, and further extracts the image information to be displayed (image information on a newly generated warning state) based on the state information etc. The cloud server 200 transmits the extracted image information to the HMD device 100.

Next, in step S 122, the control unit 10 receives the image information extracted by the cloud server 200 through the communication unit 60. At this time, the image information received from the cloud server 200 is image information indicating "information on a warning state with a high degree of urgency" associated with the third display zone Z 3.

Next, in step S 123, the control unit 10 drives the imaging position adjustment unit 80 to align the depth position of the third display zone Z 3 with the imaging position of the virtual image of the display image.

Next, in step S 124, the control unit 10 causes the display 70 to display the display image corresponding to the image information indicating "information on a warning state with a high degree of urgency" associated with the third display zone Z 3 received from the cloud server 200 in step S 107 (to update the display image).

By executing the above process, when a new warning state occurs, the HMD device 100 allows the user U to view information with a high priority as a virtual image regardless of the gaze position of the user U. As a result, newly generated information with a high priority is automatically displayed at the imaging position near the user U, thus the user U can easily organize the information added by the virtual image, and the recognition of information can be improved. When the warning state continues, the control unit 10 repeatedly executes the processing from step S 101 to display again the display image indicating the information associated with the gaze display zone of the user U. In other words, when the gaze position of the user U is not maintained in the third display zone Z 3, the imaging position of the virtual image moves to another display zone, and the display contents of the virtual image are switched from the information on the warning state with a high degree of urgency to the information associated with the gaze display zone of the user U.

Figure 9:
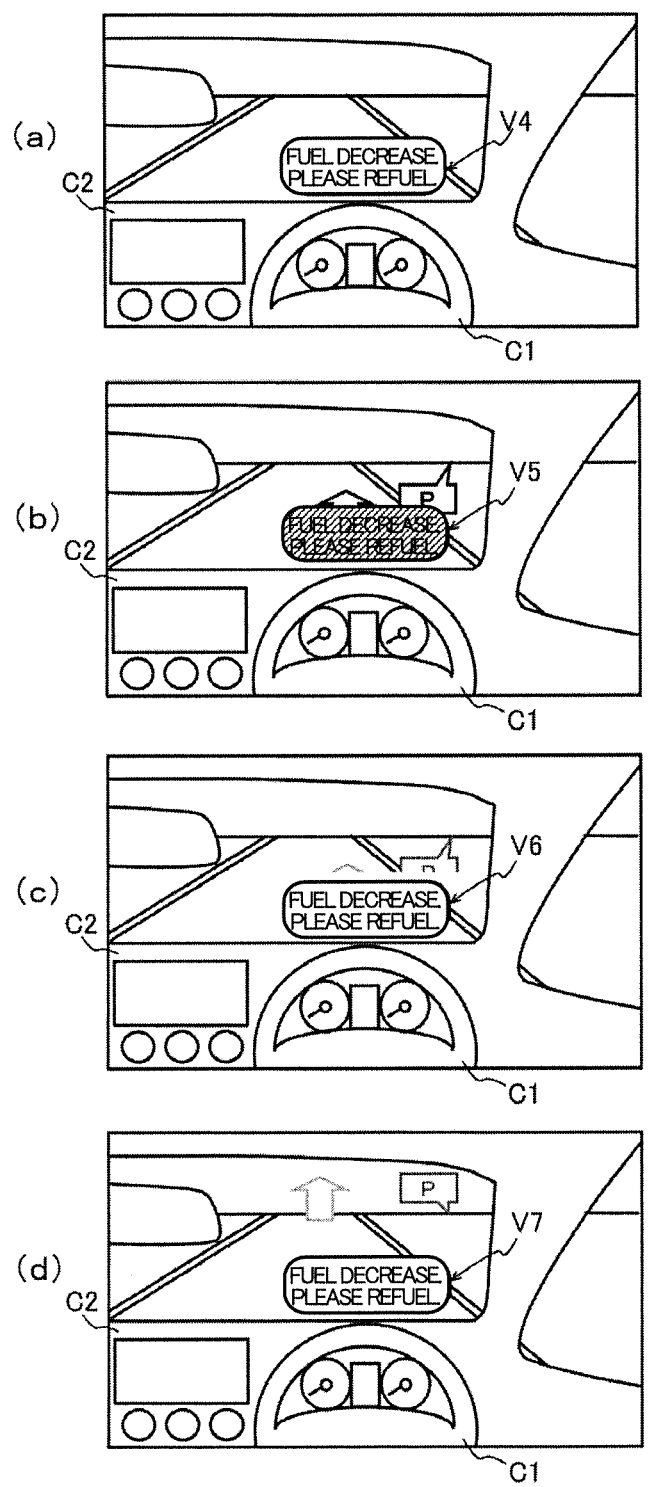
FIG. 9 is a view showing a display example by warning display processing of the head mounted display device.

FIG. 9 shows a display example by the warning display processing of the HMD device 100 when the user U is driving the vehicle C. FIG. 9 shows a virtual image of a display image visually recognized by the user U. In the first example shown in FIG. 9 (a), instead of displaying the information corresponding to the gaze position of the user U, a display image including only information on a warning state with a high degree of urgency (text message notifying a decrease in the remaining fuel (letters "Fuel decrease. Please refuel.)) is displayed on the display 70, and the virtual image V 4 of the displayed image is visually recognized by the user U. In the second example shown in FIG. 9 (b), by the warning display processing, information on a warning state with a high degree of urgency (text message notifying a decrease in the remaining fuel (letters "Fuel decrease. Please refuel.")) is overlaid so as to be on the user U side on the information associated with the gaze display zone of the user U (AR information overlaid on a scene (a route guidance mark (arrow mark) and a parking lot mark (an icon including "P")). The display 70 displays a display image in which the information on a warning state with a high degree of urgency is more emphasized than the information associated with the gaze display zone of the user U. The virtual image V 5 of the display image is visually recognized by the user U. As a specific method of emphasizing information, the above-mentioned method such as setting display brightness higher than other information or using a different display color is used. In the third example shown in FIG. 9 (c), by the warning display processing, the information on a warning state with a high degree of urgency (a text message notifying a decrease in the remaining fuel (letters "Fuel decrease. Please refuel")) is overlaid so as to be on the user U side on the information associated with the gaze display zone of the user U (AR information overlaid on a scene (a route guidance mark (arrow mark) and a parking lot mark (an icon including "P")). The display 70 displays a display image in which the information associated with the gaze display zone of the user U is lower in visibility than the information on a warning state with a high degree of urgency. The virtual image V 6 of the display image is visually recognized by the user U. As a specific method of reducing the visibility of information, there are methods of reducing the display brightness of the information lower than other information, reducing the saturation and/or lightness, blurring the display (shifting a focus), hiding a part of the information (for example, a portion overlapping with the information on a warning state with a higher degree of urgency and its periphery), and reducing the size, etc. Further, similar to the virtual image V 7 of the display image of the example shown in FIG. 9 (d), as a method of reducing the visibility of information, the information associated with the gaze display zone of the user may be moved to a display position not overlapping with the information on a warning state with a high degree of urgency.

The HMD device 100 according to the present embodiment is a head mounted display device for allowing a user U to visually recognize a virtual image overlaid on a scene. The HMD device comprises a gaze position detection unit 20 for detecting a gaze position of the user U, a display 70 for emitting display light indicating a display image, a communication unit 60 capable of communicating with a cloud server 200, a control unit 10 for causing the display 70 to display a display image corresponding to image information obtained from the cloud server 200 via the communication unit 60, and an imaging position adjustment unit 80 capable of adjusting an imaging position of a virtual image of the display image viewed by the user U by the display light.

The control unit 10 virtually sets a plurality of display zones Z 1, Z 2, Z 3 with different depth direction positions in front of the user U, specifies a display zone being gazed by the user U based on the gaze position information from the gaze position detection unit 20, drives the imaging position adjustment unit 80 to align the depth position of the identified display zone with the imaging position of the virtual image of the display image, acquires the image information indicating the information associated with the identified display zone from the cloud server 200 via the communication unit 60, and causes the display 70 to display the display image corresponding to the acquired image information.

According to the above, since the information relating to the position being gazed by the user U is automatically switched and displayed, the user U can easily organize the information added by the virtual image, and the visibility of information can be improved.

Further, in the HMD device 100, a first display zone Z 1 and a second display zone Z 2 positioned on the deeper side than the first display zone Z 1 are set as a plurality of display zones.

In the cloud server 200, first information relating to the user U and/or a mobile body (vehicle C) moving with the user U is stored in association with the first display zone Z 1, and the second information to be overlaid on a scene is stored in association with the second display zone Z 2.

Still further, in the HMD device 100, a third display zone Z 3 positioned further ahead of the first display zone Z 1 is set as a plurality of display zones. In the cloud server 200, third information relating to the warning state is stored in association the third display zone Z 3.

According to the above, since information with different priorities is automatically switched and displayed according to the position being gazed by the user U, the user U can easily organize the information added by the virtual image, and the visibility of information can be improved.

In addition, in the HMD device 100, when the control unit 10 causes the display 70 to display the display image corresponding to the acquired image information, the control unit displays to the display 70 the display image based on the gaze position information so that among the information included in the display image, the information whose virtual image is located in the vicinity of the gaze position P of the user U is emphasized with respect to the information whose virtual image is located outside the vicinity of the gaze position P of the user U.

According to this, the user U can instantaneously recognize the information closer to the gaze position among the information added by the virtual image, and the visibility of information can be improved.

In addition, in the HMD device 100, the control unit 10 determines occurrence of the warning state, and when the warning state is determined to have been occurred, drives the imaging position adjustment unit 80 to align the imaging position of the virtual image of the display image with the depth position of the third display zone Z 3 regardless of the gaze position information, acquires image information indicating the third information from the cloud server 200 via the communication unit 60, and causes the display 70 to display the display image corresponding to the image information indicating the acquired third information.

According to this, it is possible to preferentially display information on a newly generated warning state, and to provide optimum information according to the situation.

In addition, in the HMD device 100, when the control unit 10 determines that the warning state has occurred, and causes the display 70 to display the display image corresponding to the image information indicating the third information, the control unit 10 causes the display to display the display image so that the display image includes the information associated with the display zone identified based on the gaze position information and the third information, and the third information is more emphasized than the associated information.

According to this, when information relating to the newly generated warning state is preferentially displayed, the user U can easily grasp information with a higher priority, while recognizing the existence of the information related to the gaze position of the user U.

Further, in the HMD device 100, when the control unit 10 determines that the warning state has occurred, and causes the display 70 to display the display image corresponding to the image information indicating the third information, the control unit 10 causes the display to display the display image so that the display image includes the information associated with the display zone identified based on the gaze position information and the third information, and the visibility of the associated information is lower than the third information.

According to this, when information relating to the newly generated warning state is preferentially displayed, the user U can easily grasp information with a higher priority, while recognizing the existence of the information related to the gaze position of the user U.

INDUSTRIAL APPLICABILITY

The present invention is suitable for a transmission type head mounted display device for allowing a viewer to view a virtual image overlaid on a scene.

DESCRIPTION OF REFERENCE NUMERALS

100 Head mounted display device (HMD device)
10 Control unit
20 Gaze position detection unit
30 Imaging unit
40 Position information acquisition unit
50 State information acquisition unit
60 Communication unit
70 Display
80 Imaging position adjustment unit
C Vehicle
U User
V 1-V 7, V 22 Virtual image of display image

The invention claimed is:

1. A head mounted display device that allows a user to visually recognize a virtual image overlaid on a scene, comprising:
   a display for emitting display light indicating a display image;
   a central processing unit (CPU);
   a memory storing instructions that, when executed by the CPU, cause the CPU to function as:
      a gaze position detection unit for detecting a gaze position of a user;
      a control unit configured to cause the display to display the display image corresponding to image information acquired from an external server; and
      an imaging position adjustment unit configured to adjust an imaging position of a virtual image of the display image visually recognized by a user by the display light,
   wherein the control unit:
      virtually sets a plurality of display zones with different depth positions in front of the user;
      identifies, from the plurality of display zones, a display zone being gazed by the user based on the gaze position;
      drives the imaging position adjustment unit to align the imaging position of the virtual image of the display image with a depth position of the identified display zone; and
      acquires image information associated with the identified display zone from the external server, and causes the display to display the display image corresponding to the acquired image information,
   wherein the plurality of display zones includes a first display zone, a second display, and a third display zone,
   wherein the second display zone is located farther away from the user than the first display zone,
   wherein the third display zone is located closer to the user than the first display zone, and
   wherein the external server stores 1) first image information relating to the user and/or a mobile body moving with the user in association with the first display zone, 2) second image information to be overlaid on the scene in association with the second display zone, and 3) third image information relating to a warning state in association the third display zone.

2. The head mounted display device according to claim 1, wherein
   the control unit determines occurrence of the warning state, and
   when the warning state is determined to have been occurred, the control unit:

acquires the third image information from the external server;

drives the imaging position adjustment unit to align an imaging position of a virtual image of a display image corresponding to the third image information with a depth position of the third display zone regardless of the gaze position of the user; and causes the display to display the display image corresponding to the third image information.

3. The head mounted display device according to claim 2, wherein when causing the display to display the display image corresponding to the third image information along with at least one of 1) a display image corresponding to the first image information and 2) a display image corresponding to the second image information, the display image corresponding to the third image information is more emphasized than the at least one of 1) the display image corresponding to the first image information and 2) the display image corresponding to the second image information.

4. The head mounted display device according to claim 2, wherein when causing the display to display the display image corresponding to the third image information along with at least one of 1) a display image corresponding to the first image information and 2) a display image corresponding to the second image information, visibility of the at least one of 1) the display image corresponding to the first image information and 2) the display image corresponding to the second image information is lower than the display image corresponding to the third image information.

5. The head mounted display device according to claim 1, wherein when the display image corresponding to the acquired image information includes 1) a first virtual image that is located within a vicinity of the gaze position of the user and 2) a second virtual image that is located outside the vicinity of the gaze position of the user, positions of the first and second virtual images being aligned with one depth position of the identified display zone, the control unit emphasizes the first virtual image more than the second virtual image.

* * * * *